April 10, 1951 W. C. MORGAN 2,548,039
ELLIPSE COMPASS
Filed Aug. 2, 1946
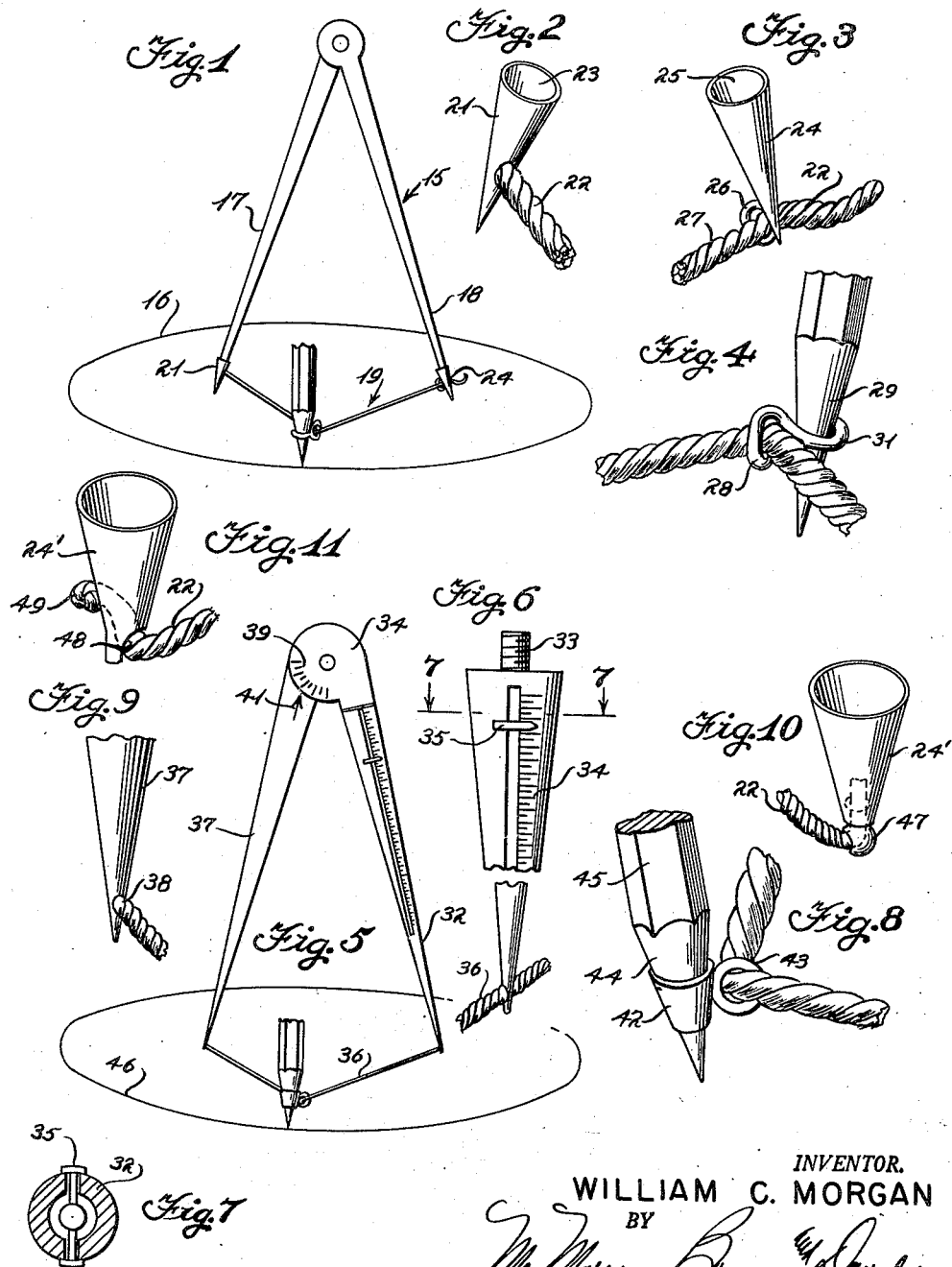
INVENTOR.
WILLIAM C. MORGAN
BY
ATTORNEYS Patented Apr. 10, 1951

2,548,039

UNITED STATES PATENT OFFICE 2,548,039

ELLIPSE COMPASS

William C. Morgan, New York, N. Y.

Application August 2, 1946, Serial No. 688,104

1 Claim. (Cl. 33—30)

This invention relates to geometrical instruments and more particularly to attachments for compasses whereby to adapt the compass for use in drawing an ellipse.

It is an object of the present invention to provide a simple and inexpensive attachment for an ordinary compass which will quickly adapt the same for use in drawing an ellipse.

It is another object of the invention to provide in such an attachment a simple means for the attachment of a flexible drawing cord or wire to the attaching elements and of the pencil to the cord for sliding movement thereover as the ellipse is inscribed.

It is another object of the invention to provide a compass attachment with calibrations whereby the distance between the foci and the length of the major axis can be automatically obtained from the compass so that a redrawing of the same ellipse at another time can be made by adjusting the compass to the previous recorded adjustments without again measuring the distances on the paper.

According to one form of the invention, small hollow points are made to be fitted over the ends of the compass. These points have attached to them the ends of a flexible cord. On the cord is a sliding element adapted to receive a pencil which is used in inscribing the ellipse. Either the length of the major axes is determined or the distance between foci before the compass is set up. To aid in this determination the cord may be marked with measurement indications. Various ways are provided by which the cord can be attached to the hollow points.

In another form of the invention a compass is provided with a leg which will have calibrations from which the length of the major axis can be taken upon closing up the compass and bringing the pencil point and cord carried thereby upwardly to the setting of the indicator on the leg. When the major axis measurement has been determined the foci distance can be found upon bringing an index mark on one leg to the calibrated point on the hub portion of the other leg.

For a better understanding of the invention reference may be had to the following detailed description taken in connection with the accompanying drawing, in which Figure 1 is a perspective view of a compass with the ellipse drawing attachment of the present invention fitted on its pointed ends and set up to inscribe the ellipse, Figure 2 is a perspective view of one of the hollow points or tabs to which one end of the cord is permanently secured, Figure 3 is a perspective view of the other hollow tab having a loop through which the cord can be adjusted and be retained in its adjusted position by tightly fitting the loop, Figure 4 is a perspective view of the cord and of the slidable element which retains the pencil, Figure 5 is a perspective view of a modified form of the invention wherein the compass itself is provided with scales from which the foci distance and the major axis distance can be determined.

Figure 6 is an enlarged fragmentary view of the calibrated leg of the compass of Figure 5 which replaces a compass or divider leg attachment when the compass is to be used for drawing an ellipse, Figure 7 is a transverse cross-sectional view taken through the calibrated leg attachment on lines 7—7 and looking in the direction of the arrows thereof, Figure 8 is a perspective view of a modified form of slidable element for a pencil tip, Figure 9 is a perspective view showing how the cord is attached through a hole in the compass point, Figure 10 is a perspective view of a modified form of hollow point or tab which is provided with a swivel connection for the cord end, Figure 11 is a perspective view of a still further form of hollow point or tab in which the cord is connected to it and lies within a relieved recess upon the bottom end of the point.

Referring now particularly to Figures 1 to 4, 15 represents a compass expanded to measure off the foci distance of an ellipse 16 which has been drawn. The compass 15 has the usual two legs 17 and 18. To the pointed ends of these legs there is connected the present ellipse drawing attachment indicated generally at 19 embodying the features of the present invention. On the end of the leg 17 there is attached a hollow point or tab 21 of the device 19. To this point 21 there is rigidly attached a cord 22. The top of the point 21 has an opening 23 for receiving the pointed end of the leg 17.

The device 19 further provides a hollow point or tab 24 adapted to fit over the pointed lower end of the leg 18. This tab 24 has an opening 25 through which the pointed end of leg 18 is thrust. The lower end of this point 24 has a loop 26 through which the free end of the cord 22 is extended. This loop is of such size that the cord when pulled through for adjustment will be retained in its adjusted position. The cord 22 may have measured markings 27 thereon so that it may be used for laying off distances.

On the cord 22 is a slide 28 bent to receive a pencil point 29. For receiving the point a portion of the slide which is made of wire is bent in circular fashion as indicated at 31. With the points 21 and 24 in place on the foci and with the cord measured off to the length of the major axis, the ellipse 16 will be inscribed as the slide 28 with the pencil is moved in an arc about the points 21 and 24.

Referring now to Figures 5-9, there is shown the form of the invention wherein the compass is provided with a removable leg or divider element in order that it may be replaced with a calibrated leg element 32. This leg element 32 has a threaded shank 33 at its upper end for its attachment to a hub portion 34 of the compass. The element 32 further has a calibrated scale 34 and a slidable indicator 35 adapted to register with the scale 34. From this scale 34 the length of the cord 36 can be measured, as when the compass is closed. The center of the cord 36 can be brought upwardly to register with the adjusted location of the indicator 35. Cord 36 is slidable through a transverse aperture in the pointed end of the calibrated leg 32 in order that it can be adjusted to the proper major axis length and so that its center can be aligned with the indicator setting.

The other end of the cord 36 is made secure to another and permanent leg 37 of the compass as indicated at 38, Figure 9. On the hub portion 34 is a scale 39 with which an indicator mark 41 on the leg 37 cooperates. As the leg 37 is adjusted the indicator 41 will be located on the scale 39 to measure off the desired foci distance between the pointed ends of the legs 32 and 37.

On the cord 36 is a pencil holder 42, having a ring portion 43 surrounding the cord. The holder 42 is in the form of a sleeve tapered to receive the sharpened pointed portion 44 of a pencil 45. With the compass in place and the pencil in the holder, the pencil and holder can be slid along the cord 36, first on one side of the legs 32 and 37 and then on the other, to inscribe an ellipse 46.

Referring to Figure 10, there is shown a modified form of tab or point 21' to be used with leg 17 of the compass 15 of Figure 1. This tab is open at its lower end and receives a swivel element 47. This element 47 is hollow and is recessed on its bottom end to receive one end of cord 22. As the cord 22 is swung from one side to the other, the element 47 will swivel in tab 21' and will not have a tendency to wind up on the point as in the case of the other tab.

Referring now to Figure 11, there is provided a tab 24' to which cord 22 can be adjustably connected. This tab 24' is recessed at its lower end as indicated at 48 to receive through its side the cord 22. The cord is then extended upwardly as shown in dotted line and through an opening in the opposite side of the tab and knotted as indicated at 49 to retain the cord in its adjusted position on the tab 24'.

While various changes may be made in the detail construction, it shall be understood that such changes shall be within the spirit and scope of the present invention as defined by the appended claim.

What is claimed is:

An ellipsograph including a pair of members pivotally connected together at their upper ends, one of said members having a pointed lower end, the other of said members including a detachable portion having a pointed lower end, said detachable portion also having a linear scale marked thereon, a movable indicator mounted on said detachable portion to cooperate with said linear scale, a cord attached to one of said pointed ends, means on said other pointed end for adjustably securing said cord thereto, a pencil holder slidably connected to the cord, said linear scale having calibrations from which the length of the major axis of an ellipse can be determined by measurement of the length of said cord when said pointed ends are closed against each other, said movable indicator serving to record such measurement for future use, one of said pivoted members having a circular scale disposed about its pivot point as a center, the other pivoted member having an index marked thereon adapted to cooperate with said circular scale to read the angular adjustment of said pivoted members relative to each other.

WILLIAM C. MORGAN.

REFERENCES CITED

The following references are of record in the file of this patent:

UNITED STATES PATENTS

| Number | Name | Date |
|---|---|---|
| 297,979 | Folger | May 6, 1884 |
| 426,288 | Leighton | Apr. 22, 1890 |
| 479,112 | Bernard | July 19, 1892 |
| 647,867 | Patterson | Apr. 17, 1900 |
| 707,580 | Gregory | Aug. 26, 1902 |
| 1,373,056 | Crowder | Mar. 29, 1921 |
| 1,510,749 | Roberts | Oct. 7, 1924 |

FOREIGN PATENTS

| Number | Country | Date |
|---|---|---|
| 138,901 | Switzerland | June 2, 1930 |
| 317,425 | Germany | Dec. 13, 1919 |